(12) United States Patent
Wang et al.

(10) Patent No.: US 8,915,062 B2
(45) Date of Patent: Dec. 23, 2014

(54) METHOD AND APPARATUS FOR MONITORING A REDUCTANT INJECTION SYSTEM IN AN EXHAUST AFTERTREATMENT SYSTEM

(75) Inventors: Yue-Yun Wang, Troy, MI (US); Charles E. Solbrig, Ypsilanti, MI (US); Stephen Paul Levijoki, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1190 days.

(21) Appl. No.: 12/576,399

(22) Filed: Oct. 9, 2009

(65) Prior Publication Data

US 2011/0083424 A1 Apr. 14, 2011

(51) Int. Cl.
*F01N 3/00* (2006.01)
*F01N 3/10* (2006.01)
*F01N 3/20* (2006.01)
*F01N 11/00* (2006.01)

(52) U.S. Cl.
CPC ............... *F01N 11/00* (2013.01); *F01N 3/208* (2013.01); *F01N 2900/1806* (2013.01); *F01N 2900/1822* (2013.01); *F01N 2610/144* (2013.01); *F01N 2610/02* (2013.01); *F01N 2900/0418* (2013.01); *Y02T 10/24* (2013.01); *F01N 2550/05* (2013.01); *F01N 2900/1808* (2013.01); *F01N 2900/1812* (2013.01); *Y02T 10/47* (2013.01)
USPC ................. 60/277; 60/274; 60/286; 60/301; 60/303

(58) Field of Classification Search
CPC ... F01N 2550/02; F01N 11/00; F01N 3/0842; F01N 3/2066; F01N 2610/03; F01N 2610/144; F01N 3/208; F01N 2090/1806; F01N 2900/1812; Y02T 10/24
USPC ............. 60/274, 277, 286, 295, 301, 303
See application file for complete search history.

(56) References Cited

U.S. PATENT DOCUMENTS

| | | | | |
|---|---|---|---|---|
| 6,363,713 B1 * | 4/2002 | Wu et al. | ......................... | 60/286 |
| 6,408,616 B1 * | 6/2002 | Mazur et al. | .................... | 60/277 |
| 6,470,673 B1 * | 10/2002 | van Nieuwstadt et al. | ..... | 60/274 |
| 6,487,852 B1 * | 12/2002 | Murphy et al. | ................. | 60/286 |
| 6,546,720 B2 * | 4/2003 | van Nieuwstadt | ............. | 60/286 |

(Continued)

FOREIGN PATENT DOCUMENTS

| | | |
|---|---|---|
| DE | 19646646 A1 | 5/1998 |
| DE | 102007030248 A1 | 1/2009 |

OTHER PUBLICATIONS

Hoffmann, Jorg, Taschenbuch der Messtechnik, pp. 166-167, Fachbuchverlag Leipzig, 2007, Germany.

*Primary Examiner* — Thomas Denion
*Assistant Examiner* — Diem Tran

(57) ABSTRACT

An internal combustion engine operating at a lean air/fuel ratio includes a reductant injection system configured to dispense reductant into an exhaust gas feedstream upstream of a selective catalytic reduction device. The reductant injection system includes a reductant delivery system fluidly coupled to a reductant dispensing device that is configured to dispense the reductant. A method for monitoring the reductant injection system includes commanding the reductant dispensing device to dispense reductant at a prescribed reductant flowrate, controlling the reductant delivery system to a preferred operating state, monitoring operation of the reductant delivery system and estimating a reductant flowrate as a function of the monitored operation of the reductant delivery system, and diagnosing operation of the reductant injection system as a function of the prescribed reductant flowrate and the estimated reductant flowrate.

7 Claims, 4 Drawing Sheets

(56) References Cited

U.S. PATENT DOCUMENTS

| | | |
|---|---|---|
| 6,662,553 B2 | 12/2003 | Patchett et al. |
| 7,134,273 B2 * | 11/2006 | Mazur et al. ............... 60/286 |
| 7,178,331 B2 | 2/2007 | Blakeman et al. |
| 7,257,941 B1 * | 8/2007 | Reuter ........................ 60/277 |
| 7,426,825 B2 | 9/2008 | Viola et al. |
| 7,934,369 B2 * | 5/2011 | Miyake ....................... 60/277 |
| 8,515,710 B2 | 8/2013 | Wang et al. |
| 2004/0040284 A1 | 3/2004 | Upadhyay et al. |
| 2004/0074229 A1 | 4/2004 | Upadhyay et al. |
| 2007/0044456 A1 | 3/2007 | Upadhyay et al. |
| 2009/0159132 A1 | 6/2009 | Gerlach |

\* cited by examiner

METHOD AND APPARATUS FOR MONITORING A REDUCTANT INJECTION SYSTEM IN AN EXHAUST AFTERTREATMENT SYSTEM

TECHNICAL FIELD

This disclosure pertains generally to exhaust aftertreatment systems for internal combustion engines.

BACKGROUND

The statements in this section merely provide background information related to the present disclosure and may not constitute prior art.

Known engine control strategies to improve fuel economy and reduce fuel consumption in internal combustion engines include operating at a lean air/fuel ratio. This includes engines configured to operate in compression-ignition and lean-burn spark-ignition combustion modes. Engines operating at lean air/fuel ratios can have increased combustion temperatures leading to increased NOx emissions.

A known exhaust aftertreatment system and control strategy for managing and reducing NOx emissions includes a reductant injection control system and an associated reductant-selective catalytic reduction device. The reductant injection control system injects a reductant, e.g., urea into an exhaust gas feedstream upstream of an ammonia-selective catalytic reduction device to reduce NOx molecules to nitrogen and oxygen. Known ammonia-selective catalytic reduction devices decompose urea to ammonia, and the ammonia reacts with the NOx molecules in the presence of a catalyst to produce nitrogen. Some amount of ammonia can be stored on the ammonia-selective catalytic reduction device, enabling continued reduction of the NOx molecules when the urea injection control system is not capable of dispensing a controlled amount of urea.

Known control systems include dispensing reductant at a rate that corresponds to concentrations of engine-out NOx emissions to achieve NOx reduction without using excess amounts of reductant, i.e., dispensing reductant at a reductant/NOx stoichiometric ratio.

SUMMARY

An internal combustion engine operating at a lean air/fuel ratio includes a reductant injection system configured to dispense reductant into an exhaust gas feedstream upstream of a selective catalytic reduction device. The reductant injection system includes a reductant delivery system fluidly coupled to a reductant dispensing device that is configured to dispense the reductant. A method for monitoring the reductant injection system includes commanding the reductant dispensing device to dispense reductant at a prescribed reductant flowrate, controlling the reductant delivery system to a preferred operating state, monitoring operation of the reductant delivery system and estimating a reductant flowrate as a function of the monitored operation of the reductant delivery system, and diagnosing operation of the reductant injection system as a function of the prescribed reductant flowrate and the estimated reductant flowrate.

BRIEF DESCRIPTION OF THE DRAWINGS

One or more embodiments will now be described, by way of example, with reference to the accompanying drawings, in which.

DETAILED DESCRIPTION

Figure 1:
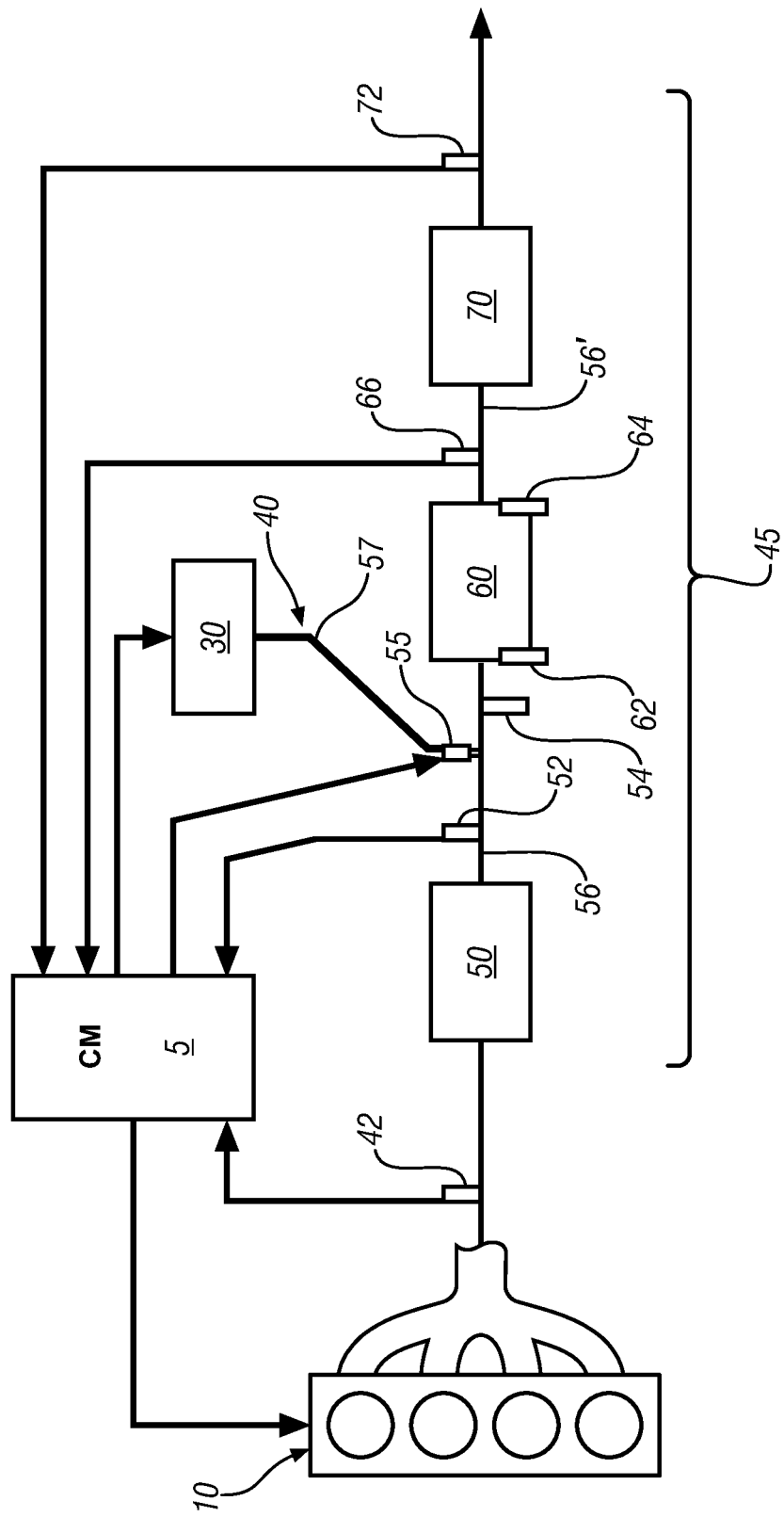
FIGS. 1 and 2 are two-dimensional schematic diagrams of an engine and exhaust aftertreatment system in accordance with the present disclosure.

Referring now to the drawings, wherein the showings are for the purpose of illustrating certain exemplary embodiments only and not for the purpose of limiting the same, FIG. 1 schematically illustrates an internal combustion engine 10, an aftertreatment system 45, and an accompanying control system including a control module 5 (CM) that have been constructed in accordance with an embodiment of the disclosure. One exemplary engine 10 is a multi-cylinder direct-injection four-stroke internal combustion engine that operates primarily at a lean air/fuel ratio. The exemplary engine 10 can include a compression-ignition engine, a spark-ignition direction-injection engine, and other engine configurations that operate using a combustion cycle that includes lean operation.

The engine 10 is equipped with various sensing devices that monitor engine operation, including an exhaust gas sensor 42 adapted to monitor the exhaust gas feedstream. The exhaust gas sensor 42 preferably is a device configured to generate an electrical signal correlatable to air/fuel ratio of the exhaust gas feedstream, from which oxygen content can be determined. Alternatively or in addition, the exhaust gas sensor 42 can be a device configured to generate an electrical signal correlatable to a parametric state of NOx concentration in the exhaust gas feedstream. Alternatively, a virtual sensing device executed as an algorithm in the control module 5 can be used as a substitute for the exhaust gas sensor 42, wherein NOx concentration in the exhaust gas feedstream is estimated based upon engine operating conditions including engine speed, mass fueling rate, and other factors. The engine 10 is preferably equipped with a mass air flow sensor to measure intake air flow, from which exhaust mass air flow can be determined. Alternatively or in combination, an algorithm can be executed to determine mass air flow through the engine 10 based upon engine rotational speed, displacement, and volumetric efficiency.

The control system includes the control module 5 that is signally connected to a plurality of sensing devices configured to monitor the engine 10, the exhaust gas feedstream, and the exhaust aftertreatment system 45. The control module 5 is operatively connected to actuators of the engine 10 and the exhaust aftertreatment system 45. The control system executes control schemes, preferably including control algorithms and calibrations stored in the control module 5, to control the engine 10 and the exhaust aftertreatment system 45. In operation the control system monitors operation of the internal combustion engine 10 and the exhaust aftertreatment system 45 and controls a reductant injection system 40 including a reductant delivery system 30 fluidly coupled to a reductant dispensing device 55 as described herein. The control system executes one or more control schemes to control the engine 10 to effect regeneration of the exhaust aftertreatment system 45.

The control module 5 is preferably a general-purpose digital computer including a microprocessor or central processing unit, storage mediums include non-volatile memory including read only memory and electrically programmable read only memory, random access memory, a high speed clock, analog to digital conversion circuitry and digital to analog circuitry, and input/output circuitry and devices, and appropriate signal conditioning and buffer circuitry. Control module as used herein refers to any method or system for processing in response to a signal or data and should be understood to encompass microprocessors, integrated circuits, computer software, computer hardware, electrical circuits, application specific integrated circuits, personal computers, chips, and other devices capable of providing processing functions. The control module 5 executes the control algorithms to control operation of the engine 10. The control algorithms are executable program instructions and calibrations stored in the non-volatile memory. The control algorithms are executed during preset loop cycles such that each algorithm is executed at least once each loop cycle. The control algorithms are executed by the central processing unit to monitor inputs from the aforementioned sensing devices and to control and monitor operation of the engine 10, the aftertreatment system 45, and the actuators. Loop cycles are executed at regular intervals, for example each 3.125, 6.25, 12.5, 25 and 100 milliseconds during ongoing engine and vehicle operation. Alternatively, algorithms may be executed in response to occurrence of an event. The engine 10 is controlled to operate at a preferred air-fuel ratio to achieve performance parameters related to operator requests, fuel consumption, emissions, and driveability, with engine fueling and/or the intake air flow controlled to achieve the preferred air-fuel ratio.

The exhaust aftertreatment system 45 is fluidly coupled to an exhaust manifold of the engine 10 to entrain the exhaust gas feedstream. The exhaust aftertreatment system 45 includes a plurality of aftertreatment devices fluidly connected in series. In one embodiment, shown in FIG. 1, first, second, and third aftertreatment devices 50, 60 and 70 are fluidly connected in series using known pipes and connectors. Each of the exhaust aftertreatment devices 50, 60 and 70 includes a device that employs technologies having various capabilities for treating the constituent elements of the exhaust gas feedstream, including oxidation, selective catalytic reduction using a reductant, and particulate filtering. Design features for each of the aftertreatment devices 50, 60 and 70, e.g., volume, space velocity, cell density, washcoat density, and metal loading can be determined for specific applications. In the embodiment shown in FIG. 1, the first aftertreatment device 50 includes an oxidation catalyst, the second aftertreatment device 60 includes an ammonia-selective catalytic reactor device in one embodiment, and the third aftertreatment device 70 includes a catalyzed particulate filter, although the concepts described herein are not so limited. The first, second, and third aftertreatment devices 50, 60 and 70 can be assembled into individual structures that are fluidly connected and assembled in an engine compartment and a vehicle underbody with one or more sensing devices placed therebetween. One skilled in the art can conceive of other assembly configurations.

The first aftertreatment device 50 preferably includes an oxidation catalytic device that includes a cordierite substrate having an alumina-based washcoat containing one or more platinum-group metals, e.g., platinum or palladium. In one embodiment the first aftertreatment device 50 may be omitted.

The second aftertreatment device 60 includes the ammonia-selective catalytic reactor device in one embodiment, preferably a cordierite substrate coated with a washcoat. In one embodiment, the second aftertreatment device 60 includes two coated substrates arranged in series. The preferred washcoat uses one of Cu-Zeolite, Fe-Zeolite, and other metal-zeolite ammonia-selective catalytic technologies as catalytic material. In one embodiment the ammonia-selective catalytic reactor includes one type of metal ion and a suitable zeolite structure supported on a cordierite substrate.

The third aftertreatment device 70 preferably includes a second oxidation catalyst combined with a particulate filter. The third aftertreatment device 70 can further include, singly or in combination, other exhaust aftertreatment devices including catalyzed or uncatalyzed particulate filters, air pumps, external heating devices, sulfur traps, phosphorous traps, selective reduction devices, and others, according to specifications and operating characteristics of a specific engine and powertrain application.

The exhaust aftertreatment system 45 includes the reductant injection system 40 including the reductant dispensing device 55 fluidly connected to the reductant delivery system 30 described with reference to FIG. 2. The reductant delivery system 30 and the reductant dispensing device 55 are each controlled by the control module 5 to dispense a prescribed mass flowrate of the ammonia reductant into the exhaust gas feedstream upstream of the ammonia-selective catalytic reactor device 60.

Sensing devices related to monitoring the aftertreatment system 45 preferably include the exhaust gas sensor 42, a first sensing device 52 immediately downstream of the first aftertreatment device 50, a second sensing device 54 immediately upstream of the ammonia-selective catalytic reactor device 60, a third sensing device 66 downstream of the ammonia-selective catalytic reactor device 60, and a fourth sensing device 72 downstream of the third aftertreatment device 70. Sensing devices further include first and second temperature monitoring sensors 62 and 64 configured to monitor temperatures related to the ammonia-selective catalytic reactor device 60. Alternatively or in addition a virtual sensing device can be used to monitor the aftertreatment system 45. A virtual sensing device can be executed as an algorithm in the control module 5 and substituted for a corresponding exhaust gas sensor. By way of example, NOx concentration in the exhaust gas feedstream can be estimated based upon engine operating conditions that are monitored using engine sensing devices. The described sensing devices related to monitoring the aftertreatment system 45 are meant to be illustrative.

The first sensing device 52 is located upstream of the second aftertreatment device 60, and is preferably configured to monitor temperature of the exhaust gas feedstream downstream of the first aftertreatment device 50. The first sensing device 52 generates a signal correlatable to temperature of the exhaust gas feedstream entering the ammonia-selective catalytic reactor device 60.

The second sensing device 54 is located immediately upstream of the ammonia-selective catalytic reactor device 60 and downstream of the reductant dispensing device 55. The second sensing device 54 generates an electrical signal correlatable to concentrations of specific gases, e.g., NOx, hydrocarbons, hydrogen cyanide, and/or acetaldehyde contained in the exhaust gas feedstream subsequent to exiting the first aftertreatment device 50

The third sensing device 66 monitors the exhaust gas feedstream after the ammonia-selective catalytic reactor device 60 and upstream of the third aftertreatment device 70, and is preferably configured to monitor constituent elements of the exhaust gas feedstream, e.g., NOx concentration. The third sensing device 66 generates a signal correlatable to the NOx concentration of the exhaust gas feedstream, or another parameter (e.g., ammonia ($NH_3$)).

The fourth sensing device 72 monitors the exhaust gas feedstream downstream of the third aftertreatment device 70, and is preferably configured to monitor constituent elements of the exhaust gas feedstream, e.g., NOx concentration. The fourth sensing device 72 generates a signal correlatable to NOx concentration or another exhaust gas constituent in the exhaust gas feedstream. Each of the first, second, third, and fourth sensing devices 52, 54, 66 and 72 are signally connected to the control module 5, which executes system control algorithms and diagnostic algorithms.

The first temperature monitoring sensor 62 measures temperature upstream of or within a front portion of the ammonia-selective catalytic reactor device 60 to determine an operating temperature thereof. The first temperature monitoring sensor 62 can be configured to monitor temperature of the exhaust gas feedstream, and alternatively can be configured to monitor temperature of the ammonia-selective catalytic reactor device 60.

The second temperature monitoring sensor 64 measures temperature downstream or within a rearward portion of the ammonia-selective catalytic reactor device 60 to determine an operating temperature thereof. The second temperature monitoring sensor 64 can be configured to monitor temperature of the exhaust gas feedstream, and alternatively can be configured to monitor temperature of the ammonia-selective catalytic reactor device 60.

Figure 2:
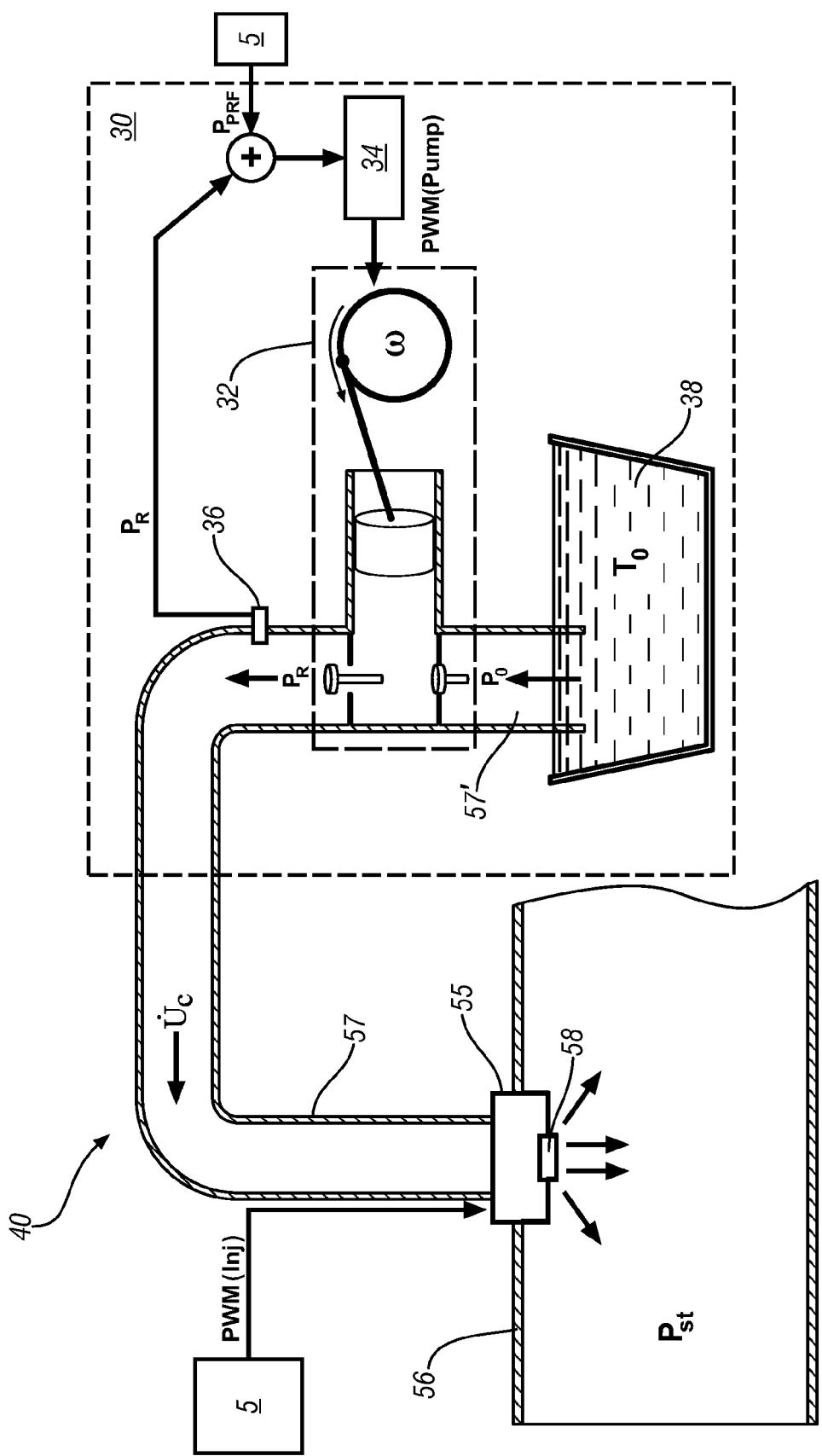

FIG. 2 shows details of the reductant injection system 40 including the reductant delivery system 30 and the reductant dispensing device 55. The reductant dispensing device 55 is configured to dispense the reductant via a nozzle 58 that is inserted into the exhaust pipe 56. The reductant dispensing device 55 dispenses the reductant into the exhaust gas feedstream passing through the exhaust pipe 56. The nozzle 58 of the reductant dispensing device 55 is inserted into the exhaust pipe 56 upstream of the ammonia-selective catalytic reactor device 60. Pressure within the exhaust pipe 56 ($P_{st}$) of the exhaust system 45 can be measured with an exhaust gas pressure sensor, or alternatively, can be estimated based upon engine operating conditions including the exhaust gas flowrate.

The reductant dispensing device 55 fluidly connects to the reductant delivery system 30 via a tube 57 that carries pressurized reductant fluid thus providing a supply of pressurized reductant to the reductant dispensing device 55. The reductant dispensing device 55 is operatively connected to the control module 5, and preferably includes a solenoid-controlled fluid flow control valve that has a fluid outlet adapted to inject the reductant into the exhaust gas feedstream in the exhaust pipe 56. The control module 5 executes algorithmic code to monitor operating conditions of the engine 10 and operating parameters of the aftertreatment system 45 and determine a mass flowrate of the exhaust gas feedstream including a concentration and mass flowrate of NOx emissions. A prescribed reductant mass flowrate $\dot{U}_C$ is commanded. The prescribed reductant mass flowrate $\dot{U}_C$ preferably achieves a reductant/NOx stoichiometric ratio and provides sufficient mass flowrate of the reductant to reduce the concentration and mass flow of NOx emissions to nitrogen in the presence of the catalytic material of the ammonia-selective catalytic reactor device 60. The control module 5 executes algorithmic code to generate an injector control signal, e.g., a pulsewidth-modulated control signal (PWM (Inj)) to the reductant dispensing device 55 at a commanded pressure in the tube 57 that corresponds to the prescribed reductant mass flowrate $\dot{U}_C$.

The reductant delivery system 30 includes a reductant pump 32 and associated control module 34 and a reductant storage tank 38 fluidly connected to an inlet 57' to the reductant pump 32. In one embodiment the reductant pump 32 includes a motor driven positive-displacement pump mechanism including a reciprocating piston contained in a housing having intake and outlet valves. Reciprocating motion of the piston is caused by an electrically-powered motor that is actuated by the control module 34. Reduction gearing between the motor and pump mechanism may provide a gear ratio for the pump. Reductant stored in the reductant storage tank 38 can be characterized in terms of a temperature state $T_0$ and a pressure state $P_0$, the pressure state $P_0$ associated with inlet pressure to the reductant pump 32. Preferably the reductant delivery system 30 is configured such that there is gravity flow of reductant from the reductant storage tank 38 to the inlet of the reductant pump 32. The outlet of the reductant pump 32 fluidly connects to the tube 57 that carries pressurized reductant to the reductant dispensing device 55. A pressure sensor 36 is adapted to monitor reductant pressure $P_R$ within the tube 57 in one embodiment. In operation, the control module 5 controls the reductant delivery system 30 to a preferred operating state, for example by generating a preferred pressure $P_{PRF}$ for the reductant delivery system 30. A difference between the monitored reductant pressure $P_R$ and the preferred pressure $P_{PRF}$ within the tube 57 is determined, and sent to the control module 34, which generates a pump control signal for operating the reductant pump 32 based thereon. The control module 34 controls operation of the reductant pump 32 in response to the pump control signal. A control parameter for the reductant pump 32 can include a pump control signal including one of a pump motor speed $\omega$ and a pump motor duty cycle PWM(Pump) of the reductant pump 32. In one embodiment, the preferred or desired pressure $P_{PRF}$ is 6000 mbar(abs). The control module 34 may be separate from or integrated with the control module 5. Both control module 5 and control module 34 are part of the control system referred to herein.

The control system monitors operation of the reductant delivery system 30 and the reductant dispensing device 55 and determines an estimated reductant mass flowrate $\dot{U}_a$ in the reductant delivery system 30 associated with the monitored operation of the reductant delivery system 30. In operation, the prescribed reductant mass flowrate $\dot{U}_C$ is compared to the estimated reductant mass flowrate $\dot{U}_a$. The estimated reductant mass flowrate $\dot{U}_a$ is associated with the control parameter of the reductant pump 32, taking into account flow-related factors including the reductant pressure $P_R$ within the tube 57, the temperature state $T_0$ and the pressure state $P_0$. Thus, operation of the reductant injection system 40 including the reductant dispensing device 55 and the reductant delivery system 30 can be diagnosed, and a fault can be identified when the prescribed reductant mass flowrate $\dot{U}_C$ varies from the estimated reductant mass flowrate $\dot{U}_a$ by an amount that exceeds a threshold.

Reductant flowrate in the reductant delivery system 30 associated with the monitored operation can be estimated based upon monitored operation thereof. A mass flowrate out of the positive-displacement reductant pump 32 can be modeled by Eq. 1:

$$\dot{U} = \frac{g \cdot \omega \cdot P_0 \cdot D}{R \cdot T_0} \eta(P_R, \omega), \quad \eta \approx 1 \qquad [1]$$

wherein
$\dot{U}$ is the reductant mass flowrate,
$\omega$ is the pump motor speed,
g is a gear ratio for the pump,
D is the volumetric piston displacement,
$P_0$ is the inlet pressure of the reductant,
$T_0$ is the inlet temperature of the reductant, $P_R$ is the measured pressure in the tube 57,
R is the ideal gas constant, and
η is efficiency of the reductant pump 32.

A reductant volumetric flowrate $\dot{U}/\rho$ can be shown as proportional to the pump motor speed ω, as set forth in Eq. 2:

$$\frac{\dot{U}}{\rho} = \frac{\dot{U} \cdot RT_0}{P_0} = g \cdot \omega \cdot D \qquad [2]$$

wherein ρ is density of the reductant.

Thus, the estimated reductant mass flowrate $\dot{U}_a$ can be determined based upon the pump motor speed ω, the gear ratio for the pump g, the volumetric piston displacement D, and density of the reductant p in accordance with Eq. 3 as set forth below.

$$\dot{U}_a = g \cdot \omega \cdot \rho \cdot D \qquad [3]$$

The prescribed reductant mass flowrate $\dot{U}_C$ is known, and is a predetermined reductant mass flowrate that is required to react with a concentration of NOx emissions in the ammonia-selective catalytic reactor device 60 to reduce the NOx emissions to nitrogen, as described herein.

A reductant flowrate error $e_{FR}$ can be calculated as a difference between the prescribed reductant mass flowrate $\dot{U}_C$ and the estimated reductant mass flowrate $\dot{U}_a$, as set forth in Eq. 4.

$$e_{FR} = \dot{U}_C - \dot{U}_a \qquad [4]$$

When the absolute value of the reductant flowrate error $e_{FR}$ exceeds a predetermined threshold, a fault is identified with the reductant delivery system 30 including the reductant pump 32. When the reductant flowrate error $e_{FR}$ is greater than zero, i.e., a positive value, it indicates an under-dosing fault wherein less reductant is being delivered than prescribed. When the reductant flowrate error $e_{FR}$ is less than zero, i.e., a negative value, it indicates an over-dosing fault wherein more reductant is being delivered than prescribed.

In an operating system wherein pump motor speed co is not measured, the control module 34 drives the reductant pump 32 using the pump motor duty cycle PWM(Pump) as the control parameter. A time-rate change in the pump motor speed ω and electric current i can be expressed as a vector equation. The vector equation that is a second order state space model with inputs including pump motor speed ω, the pump motor duty cycle in percent (depicted as PWM(Pump) in FIG. 2 and as PWM in the following equations), pressure $P_R$, and motor winding temperature $T_M$ of the electric motor for the reductant pump 32 as set forth below.

$$\begin{bmatrix} \dot{i} \\ \dot{\omega} \end{bmatrix} = \begin{bmatrix} a_{11} & a_{12} \\ a_{21} & a_{22} \end{bmatrix} \begin{bmatrix} i \\ \omega \end{bmatrix} + \begin{bmatrix} b_{11} & 0 \\ 0 & b_{22} \end{bmatrix} \begin{bmatrix} PWM \\ P_R \end{bmatrix} \qquad [5]$$

The state space parameters of Eq. 5 are determined by the motor design. They are constants but slightly varying with variations in motor winding temperature $T_M$.

A system identification approach can be used to reduce Eq. 5 as follows, thus eliminating the electrical current as a required monitored state. A time-rate change in the pump motor speed ω can be estimated as a function of states of the pump motor speed ω, pump motor duty cycle in percent (PWM), pressure $P_R$, and motor winding temperature $T_M$ of the electric motor for the reductant pump 32 as follows.

$$\dot{\omega} = f(\omega, PWM, P_R, T_M) \qquad [6]$$

Eq. 6 can be rewritten as a difference equation associated with the estimated reductant mass flowrate $\dot{U}_a$ adjusted for density of the reductant ρ to yield an estimated volumetric flow as follows.

$$\frac{d}{dt}\left(\frac{\dot{U}_a}{\rho}\right) = f\left(\frac{\dot{U}_a}{\rho}, PWM, T_M\right) \qquad [7]$$

Eq. 7 can be integrated over time to estimate the total reductant mass flow, i.e., $\int \dot{U}_a * dt$, which can be compared to an integrated value for the prescribed reductant mass flowrate $\dot{U}_C$ over time, i.e., $\int \dot{U}_C * dt$.

A reductant integrated flow error term $e_F$ can be calculated as follows.

$$e_F = \frac{\left| \int \dot{U}_c - \int \dot{U}_a \right|}{\int \dot{U}_c} \qquad [8]$$

A fault can be identified when the reductant integrated flow error term $e_F$ exceeds a threshold, e.g., 50%. The threshold can be associated with an effect of flow of the reductant upon NOx emissions reduction performance of the ammonia-selective catalytic reactor device 60. This evaluation enables identifying faults related to the solenoid valve for the reductant dispensing device 55, a leak or clog in the reductant dispensing device 55 including the nozzle 58, and a blockage in the tube 57, e.g., due to freezing or another problem.

Figure 4:
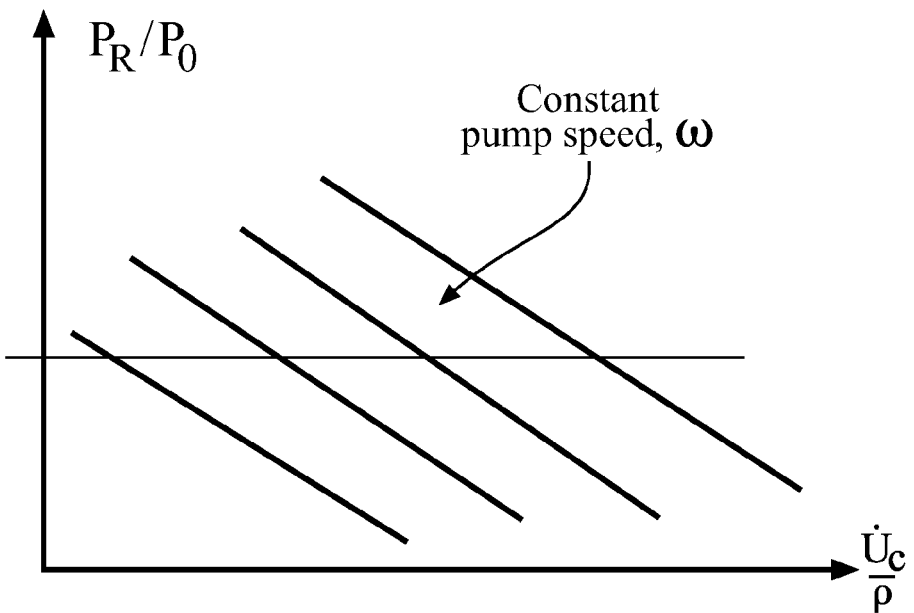

FIG. 4 graphically shows a range of pressure ratios $P_R/P_0$ for an exemplary pump 32 corresponding to a range of prescribed mass flowrates of reductant $\dot{U}_C$ adjusted for density of the reductant ρ, expressed as a commanded reductant volumetric flowrate $$\frac{\dot{U}_c}{\rho}.$$

The pressure ratio $P_R/P_0$ is a pressure gain from input pressure to output pressure for an exemplary pump 32. A line of constant pump motor speed ω is shown, depicting that an increase in the commanded reductant volumetric flowrate $$\frac{\dot{U}_c}{\rho}$$

requires a corresponding increase in pump motor speed ω to maintain the pressure ratio $P_R/P_0$ at a selected or target pressure ratio.

Figure 3:
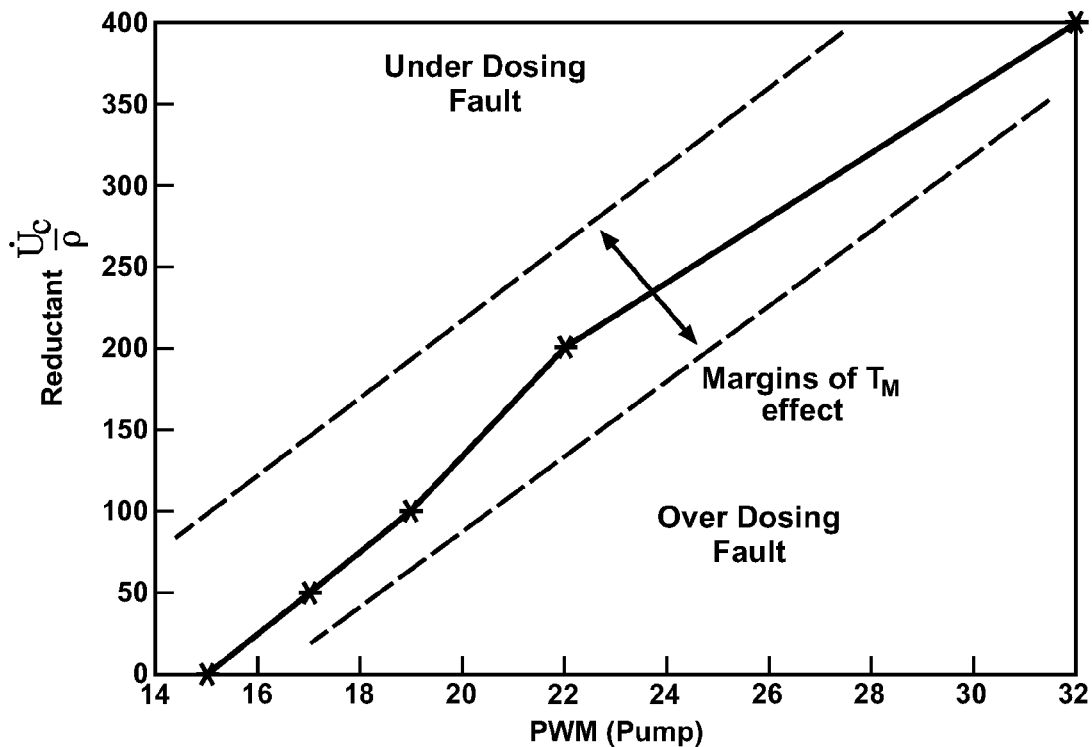
FIGS. 3-5 are datagraphs in accordance with the present disclosure.

FIG. 3 graphically shows a range of commanded reductant volumetric flowrates $$\frac{\dot{U}_c}{\rho}$$

corresponding to a range of pump motor duty cycles PWM (Pump) under quasi-steady state operation for an exemplary reductant delivery system 30 including the reductant pump 32. The results depict an acceptable band of operation and associated thresholds for reductant under-dosing and reductant over-dosing. Due to variations in the ambient pressure, reductant temperature, and pump motor operating temperature and efficiencies, the relationship may vary, as indicated by the acceptable band of operation within the dashed lines (Margins of $T_M$ effect). Pattern recognition can be applied to detect reductant injection faults based on the relationship between commanded reductant volumetric flowrate $$\frac{\dot{U}_c}{\rho}$$

and the pump motor duty cycle PWM(Pump). When there is a blocked line, e.g., reductant within tube 57 is frozen, or the reductant dispensing device 55 fails to open, such a fault can be detected when the reductant delivery system 30 commands a high reductant volumetric flowrate $$\frac{\dot{U}_c}{\rho}$$

at a low percentage state for the pump motor duty cycle PWM(Pump). By way of example, such a fault can be identified when the system commands a pump motor duty cycle less than 16% to achieve a prescribed reductant mass flowrate of 400 mg/sec. When there is leakage in the reductant delivery system 30, such a fault can be detected when the reductant delivery system 30 commands a low reductant volumetric flowrate $$\frac{\dot{U}_c}{\rho}$$

with a high percentage state for the pump motor duty cycle PWM(Pump). By way of example, such a fault can be identified when the system commands a pump motor duty cycle greater than 70% to achieve a prescribed reductant mass flowrate of 50 mg/sec.

Figure 5:
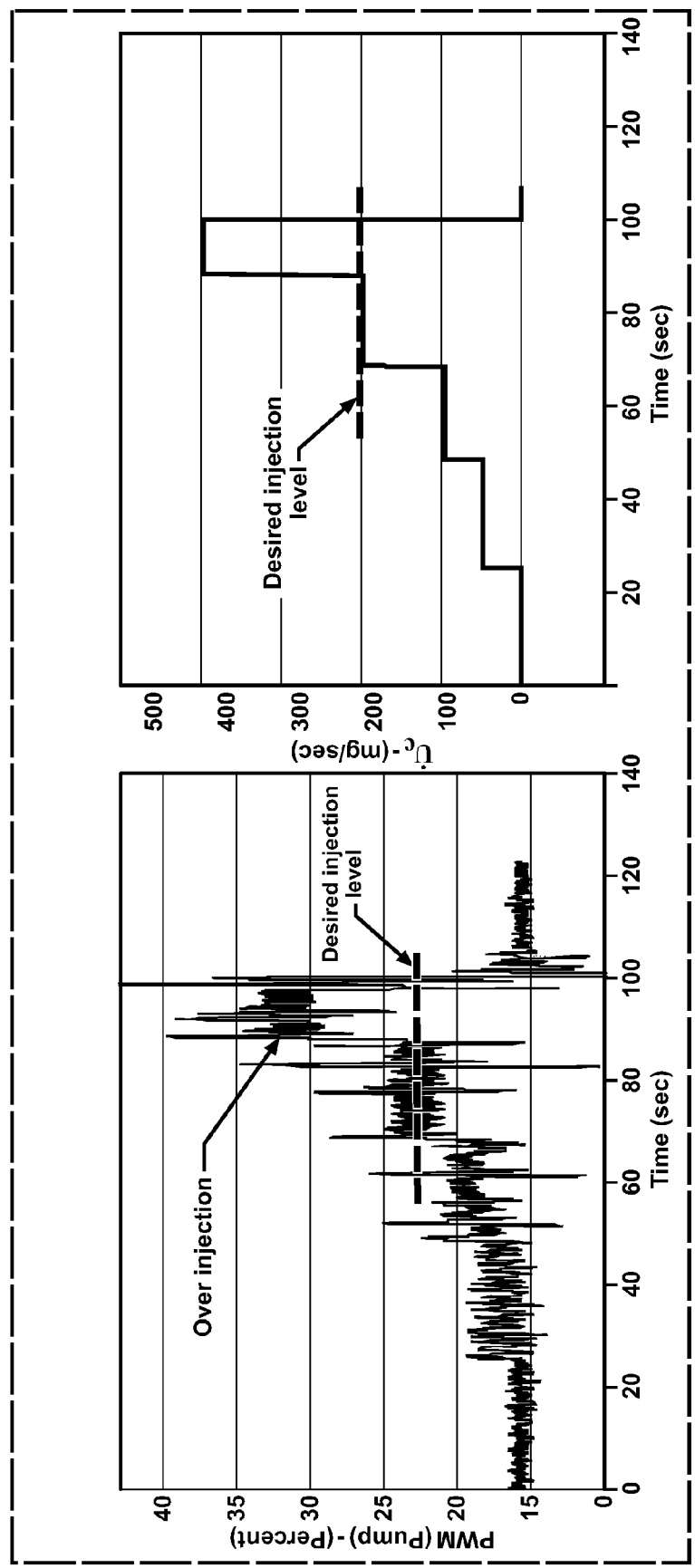

FIG. 5 graphically shows pump motor duty cycle (PWM (Pump)-(Percent)) and prescribed reductant mass flowrate $\dot{U}_C$ plotted over time, and depicts a desired injection level associated with the pump motor duty cycle (PWM) and the prescribed reductant mass flowrate $\dot{U}_C$, including depiction of a reductant over-injection event.

The reductant mass flowrate $\dot{U}$ can be defined by a nonlinear function as set forth below in Eq. 9:

$$\dot{U} = \rho f(P_R, v) = \rho \tilde{f}(P_R, \omega) \quad [9]$$

wherein v is the piston speed, and $\tilde{f}$ is an estimation function that determines the reductant mass flowrate $\dot{U}$ based upon pressure $P_R$ and pump motor speed $\omega$.

Eq. 9 can be reduced as shown in Eq. 10 using input PWM and P and output dU/dt. FIG. 5 shows actual reductant mass flowrate $\dot{U}$ and the estimated reductant mass flowrate $\dot{U}_a$ from the above model in Eq. 7.

$$\frac{\dot{U}_c}{\rho} = f\left(\frac{\dot{U}}{\rho}, PWM, T_M\right) \quad [10]$$

The operation of the reductant dispensing device 55 is monitored by the control system. The reductant flowrate through the reductant dispensing device 55 can be estimated using a liquid flow orifice equation that is representative of operation of the nozzle 58 for the reductant dispensing device 55 as set forth in Eq. 11:

$$\dot{U}_a = f_{AREA}(PWM)\sqrt{2\frac{\overline{P}}{RT_0}(\overline{P} - P_{st})} \quad [11]$$

wherein $\overline{P}$ is an average value of the measured line pressure $P_R$, and $f_{AREA}$ is an equivalent or effective injector orifice area for the reductant dispensing device 55 that corresponds to the control signal from the control module 5, i.e., the pulsewidth-modulated (PWM) control signal corresponding to the prescribed reductant mass flowrate $\dot{U}_C$.

By canceling any common effects associated with temperature and PWM, a ratio of the prescribed reductant mass flowrate $\dot{U}_C$ and the estimated reductant mass flowrate $\dot{U}_a$ can be determined, with an operating line pressure of 6000 mbar:

$$\frac{\dot{U}_a}{\dot{U}_c} = \frac{\sqrt{\overline{P}(\overline{P} - P_{st})}}{\sqrt{P_R(P_R - P_{st})}} \text{ or } \dot{U}_a = \frac{\sqrt{\overline{P}(\overline{P} - P_{st})}}{\sqrt{6000(6000 - P_{st})}}\dot{U}_c \quad [12]$$

Estimated and prescribed quantities of injected reductant can be calculated using integration as respectively set forth below.

$$U_a = \int \dot{U}_a = \int \frac{\sqrt{\overline{P}(\overline{P} - P_{st})}}{\sqrt{6000(6000 - P_{st})}}\dot{U}_c \cdot dt \quad [13]$$

$$U_c = \int \dot{U}_c \quad [14]$$

The reductant integrated mass flow error term $e_F$ can be calculated as follows.

$$e_F = \frac{\left|\int \dot{U}_c - \int \dot{U}_a\right|}{\int \dot{U}_c} \quad [15]$$

When the reductant integrated mass flow error term $e_F$ exceeds a predetermined threshold, e.g., 50%, a fault can be identified in the reductant delivery system 30, e.g., a leak in the tube 57.

An injector fault can include monitoring the pump pressure to identify a fault in reductant flow, including using Eq. 13, above. When there is a drop in line pressure $P_R$ resulting in 50% of prescribed reductant being injected, Eq. 12 becomes $$2 = \frac{\sqrt{P_R(P_R - P_{st})}}{\sqrt{\overline{P}(\overline{P} - P_{st})}}, \text{ therefore } 4 = \frac{P_R(P_R - P_{st})}{\overline{P}(\overline{P} - P_{st})}. \quad [16]$$

When there is a decrease in the pump pressure, $$\overline{P} = \alpha P_R \text{ and } P_{st} = P_R/k \quad [17]$$

Eqs. 16 and 17 can be reduced to Eq. 18 as follows.

$$4\alpha^2 - \frac{4}{k} \cdot \alpha + \left(\frac{1}{k} - 1\right) = 0 \quad [18]$$

Since k is known, the a term can be calibrated by solving Eq. 18. Illustrative values for k and a corresponding a term are shown in Table 1.

TABLE 1

| k | α |
|---|---|
| 3.72 | 0.5382 |
| 5 | 0.5583 |
| 7.24 | 0.5826 |

Thus, a drop in pressure between 40 and 50% results in injection of about half the prescribed reductant mass flowrate $\dot{U}_C$, depending upon the k factor as affected by the pressure in the exhaust pipe $P_{st}$. Potential root causes of faults include a fault with the reductant pump 32 and a leak in the tube 57.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a reductant injection system including a reductant delivery system fluidly coupled to a reductant dispensing device configured to dispense reductant into an exhaust gas feedstream of an internal combustion engine upstream of an ammonia-selective catalytic reduction device, comprising:
   commanding the reductant dispensing device to dispense reductant at a prescribed reductant flowrate ($\dot{U}_C$) that achieves a stoichiometric ratio of reductant to NOx in the exhaust gas feedstream upstream of the ammonia-selective catalytic reduction device;
   controlling the reductant delivery system to achieve a preferred operating state comprising a desired fluidic pressure in the reductant delivery system to dispense the reductant at the prescribed reductant flowrate ($\dot{U}_C$);
   monitoring fluidic pressure in the reductant delivery system;
   determining a ratio of an estimated reductant flowrate out of a reductant pump ($\dot{U}_a$) and the prescribed reductant flowrate ($\dot{U}_C$) corresponding to the desired fluidic pressure and the monitored fluidic pressure; and
   diagnosing operation of the reductant injection system based upon the prescribed reductant flowrate $\dot{U}_C$) and the estimated reductant flowrate out of the reductant pump $\dot{U}_a$).

2. The method of claim 1, wherein diagnosing operation of the reductant injection system based upon the prescribed reductant flowrate $\dot{U}_C$)and the estimated reductant flowrate out of the reductant pump ($\dot{U}_C$)comprises identifying a fault associated with the reductant injection system when a difference between the prescribed reductant flowrate ($\dot{U}_C$)and the estimated reductant flowrate out of the reductant pump ($\dot{U}_a$) exceeds a threshold.

3. The method of claim 1, comprising determining the ratio of the estimated reductant flowrate out of the reductant pump ($\dot{U}_a$) and the prescribed reductant flowrate ($\dot{U}_C$) corresponding to the desired fluidic pressure and the monitored fluidic pressure in accordance with the following relationship:

$$\frac{\dot{U}_a}{\dot{U}_c} = \frac{\sqrt{\overline{P}(\overline{P} - P_{st})}}{\sqrt{P_R(P_R - P_{st})}}$$

wherein $\dot{U}_a$ is the estimated reductant flowrate out of the reductant pump comprising a mass flowrate,
$\dot{U}_C$ is the prescribed reductant flowrate comprising a mass flowrate,
$\overline{P}$ is the average value of the measured fluidic pressure in the reductant delivery system,
$P_R$ is the measured fluidic pressure in the reductant delivery system, and
$P_{st}$ is pressure in the exhaust gas feedstream.

4. Method for monitoring injection of a reductant into an exhaust gas feedstream upstream of an ammonia-selective catalytic reduction device, comprising:
   commanding a reductant dispensing device to dispense reductant at a prescribed reductant flowrate ($\dot{U}_C$)from a supply of pressurized reductant to achieve a stoichiometric ratio of reductant to NOx in the exhaust gas feedstream upstream of the selective catalytic reduction device;
   providing a control signal to a reductant delivery system to establish the supply of pressurized reductant at a desired pressure;
   monitoring fluidic pressure in the reductant delivery system;
   determining a ratio of an estimated reductant flowrate out of a reductant pump ( $\dot{U}_a$) of the reductant delivery system and the prescribed reductant flowrate ($\dot{U}_C$) corresponding to the desired fluidic pressure and the monitored fluidic pressure; and
   diagnosing operation of the reductant injection system based upon the prescribed reductant flowrate ($\dot{U}_C$) and the estimated reductant flowrate out of the reductant pump ($\dot{U}_a$).

5. The method of claim 4, comprising determining the ratio of the estimated reductant flowrate out of the reductant pump ($\dot{U}_C$) and the prescribed reductant flowrate ($\dot{U}_C$) corresponding to the desired fluidic pressure and the monitored fluidic pressure in accordance with the following relationship:

$$\frac{\dot{U}_a}{\dot{U}_c} = \frac{\sqrt{\overline{P}(\overline{P} - P_{st})}}{\sqrt{P_R(P_R - P_{st})}}$$

wherein $\dot{U}_a$ is the estimated reductant flowrate out of the reductant pump comprising a mass flowrate,
$\dot{U}_C$ is the prescribed reductant flowrate comprising a mass flowrate,
$\overline{P}$ is the average value of the measured fluidic pressure in the reductant delivery system, $P_R$ is the measured fluidic pressure in the reductant delivery system, and $P_{st}$ is pressure in the exhaust gas feedstream.

6. A reductant injection system, comprising:

a reductant dispensing device receiving a supply of pressurized reductant;

a control module commanding the reductant dispensing device to dispense reductant at a prescribed reductant flowrate ($\dot{U}_C$) from the supply of pressurized reductant to achieve a stoichiometric ratio of reductant to NOx in the exhaust gas feedstream upstream of an ammonia-selective catalytic reduction device;

a reductant delivery system including a motor driving a reductant pump to establish the supply of pressurized reductant;

a control module providing a control signal to control the motor driving the reductant pump to establish the supply of pressurized reductant at a desired pressure; and a control module monitoring fluidic pressure in the reductant delivery system, determining a ratio of an estimated reductant flowrate out of the reductant pump ($\dot{U}_a$) and the prescribed reductant flowrate ($\dot{U}_C$) corresponding to the desired fluidic pressure and the monitored fluidic pressure, determining the reductant flowrate out of the reductant pump ($\dot{U}_a$) based upon the prescribed reductant flowrate ($\dot{U}_a$) and the ratio of the estimated reductant flowrate out of the reductant pump ($\dot{U}_a$) and the prescribed reductant flowrate ($\dot{U}_C$), and diagnosing operation of the reductant injection system based upon the prescribed reductant flowrate ($\dot{U}_C$) and the estimated reductant flowrate out of the reductant pump ($\dot{U}_a$).

7. The method of claim 6, comprising determining the ratio of the estimated reductant flowrate out of the reductant pump ($\dot{U}_a$) and the prescribed reductant flowrate ($\dot{U}_C$) corresponding to the desired fluidic pressure and the monitored fluidic pressure in accordance with the following relationship:

$$\frac{\dot{U}_a}{\dot{U}_c} = \frac{\sqrt{\overline{P}(\overline{P}-P_{st})}}{\sqrt{P_R(P_R-P_{st})}}$$

wherein $\dot{U}_a$ is the estimated reductant flowrate out of the reductant pump comprising a mass flowrate, $\dot{U}_C$ is the prescribed reductant flowrate comprising a mass flowrate, $\overline{P}$ is the average value of the measured fluidic pressure in the reductant delivery system, $P_R$ is the measured fluidic pressure in the reductant delivery system, and $P_{st}$ is pressure in the exhaust gas feedstream.

* * * * *